United States Patent
Charbonneau

[15] 3,659,926
[45] May 2, 1972

[54] BEAM DISPLACER

[72] Inventor: Marcel L. Charbonneau, 890 S. Ponderosa, Orange, Calif. 92666
[22] Filed: May 15, 1970
[21] Appl. No.: 37,526

[52] U.S. Cl............................................350/285, 350/286
[51] Int. Cl.....................................................G02f 1/34
[58] Field of Search..............350/285, 25, 48, 286; 285/367, 285/411; 24/263.4

[56] References Cited

UNITED STATES PATENTS

| | | | |
|---|---|---|---|
| 3,450,457 | 6/1969 | Clave et al. | 350/52 |
| 3,360,323 | 12/1967 | Weisman et al. | 350/286 |
| 1,581,659 | 4/1926 | Roach | 350/286 |
| 3,181,901 | 5/1965 | Watts | 285/367 |
| 3,070,388 | 12/1962 | Werth | 285/411 |
| 3,024,511 | 3/1962 | Schlueter | 24/263 |

*Primary Examiner*—Ronald L. Wibert
*Assistant Examiner*—Warren A. Sklar
*Attorney*—Raymond L. Madsen and Richard M. Jennings

[57] ABSTRACT

An apparatus for displacing an optical beam to a selected point anywhere within a circular area, providing extensive linear displacement of the beam, includes a plurality of pairs of parallel reflective surfaces. Each pair is arranged to receive an incoming beam and provide an exiting beam that is precisely parallel to the incoming beam. One of the pairs is mounted for rotation substantially about the axis of the incoming beam. At least another of the pairs is mounted to the first pair for rotation about the axis of the exiting beam of the first pairs. The two are relatively positioned so that the exiting beam of the first pair is the incoming beam of the second pair and the two are mounted for linear and rotational motion together along and about a vertical axis. The arrangement receives a light beam directed substantially horizontally to a first reflective surface of the first prism whereby the exiting beam from the second prism can be selectively positioned at any point within a circle lying in a substantially vertical plane. The various relatively movable parts are provided with clamped joints to maintain them in a selected relative position. The clamps normally provide a substantial friction force to lock one movable part with respect to another. A device is provided for opening the clamps a fixed amount to unlock the structure and allow one movable part to be rotated with respect to another while maintaining the required friction force for the structure to be self-supporting, thereby preventing accidental damage caused by the structure moving under its own weight.

7 Claims, 15 Drawing Figures

Patented May 2, 1972 3,659,926
4 Sheets-Sheet 1
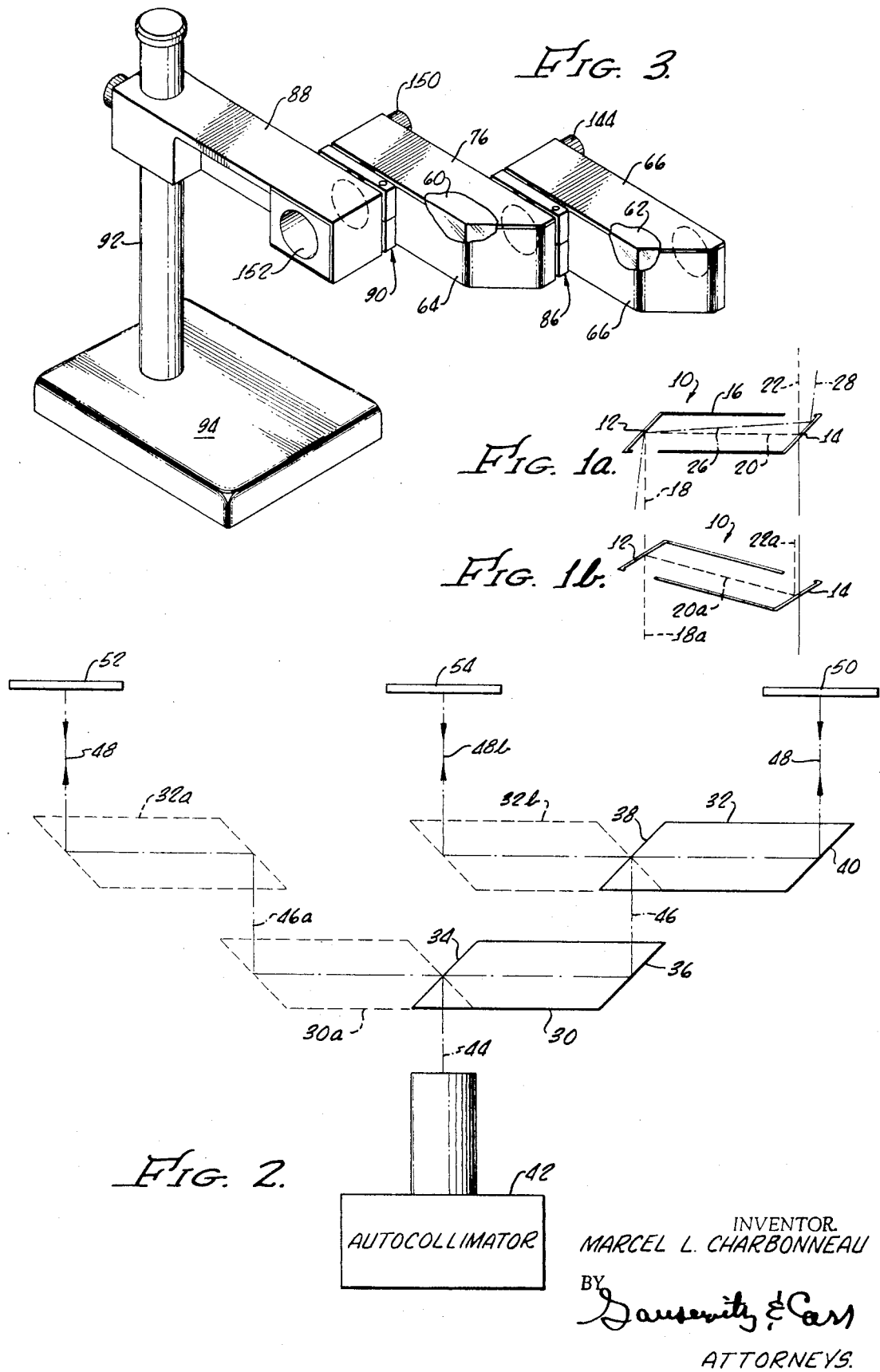
INVENTOR.
MARCEL L. CHARBONNEAU
BY Dausevity & Carr
ATTORNEYS.

Patented May 2, 1972

INVENTOR.
MARCEL L. CHARBONNEAU

BY Sausewitz & Carr

ATTORNEYS.

Patented May 2, 1972
3,659,926

INVENTOR.
MARCEL L. CHARBONNEAU
BY
Gausewitz & Carr
ATTORNEYS.

INVENTOR.
MARCEL L. CHARBONNEAU
BY
Gauserwitz & Cass
ATTORNEYS.

BEAM DISPLACER

BACKGROUND OF THE INVENTION

1. Field of the Invention

The present invention relates to transmission of energy beams and more particularly concerns controlled manipulation of a reference or working line of sight provided by such energy beam.

2. Description of Prior Art

Directive properties of the propagation of an energy beam have long been recognized and dictate its use in a wide variety of precision alignment tasks. Beams of light energy and, in particular, the coherent high power, low divergence laser beams, are extensively employed in autocollimators, testing of optical systems, flat and curved reflectors, establishing and checking alignment of manufacturing tools, fixtures, jigs, and many other well known industrial and scientific applications. In all such arrangements, a light source positioned at a known point or projected along a predetermined or reference line is carefully set up and an object under test or observation is subjected to the beam. Commonly, a mirror on the object is employed to reflect the light beam directly back to the source whereby an exact coincidence of projected and reflected light indicates a precise orthogonal orientation of the mirror surface to the axis of the reflective beam. Since the mirror is fixed to the object under observation or test, the angular orientation of such object is accordingly established or determined.

In employing a light beam as a reference or a measurement point, great care is required to establish and stabilize the original line of sight, namely, the axis of the projected beam. Obviously, movement of the light source or its projected beam during the measurement would seriously degrade or entirely nullify any results desired. In those situations where a number of objects are to be observed by projection of a light beam thereto, or in situations where several different points of the same object are to be observed, it is common to employ either a number of such carefully established reference lines of sight or to re-establish an exact reference positioning of the light source for each of a number of observations. For example, in order to check relative alignment of structural members of the wing of an aircraft, a series of mirrors will be fixedly positioned, each on one of the structural members and having their reflective surfaces lying in a common plane or in substantially parallel planes. In order to determine that the several mirrors and, accordingly, the structural members to which the individual mirrors are affixed, have a predetermined relative orientation, each mirror is subjected to a light beam projected along a known direction. As previously indicated, when the reflected beam is exactly coincident with the projected beam, the orientation of the mirror relative to the line of sight of the reference beam is known. Where each of the mirrors is differently positioned tranversely of the direction of the reference beam, it is required to carefully establish a line of sight at a number of different locations so as to impinge upon each of the mirrors in turn. The time, effort, and loss of accuracy involved in establishing a new reference setup for each measurement are serious disadvantages of this mode of alignment.

In another mode of operation and use of an optical line of sight for measurement, flatness of a large optical mirror is established or measured by causing a reference beam to traverse the mirror and be reflected therefrom. Either the initial light source or a reflector thereof is positioned on a precision carriage so that the reference beam may be reflected by a mirror carried by the carriage to different points of the surface under test. Again, the time and effort involved in establishment of the line of sight and carriage is an undesired burden and is further complicated by the required precision of the carriage for effecting a displacement of the reference beam. These are but two of the many requirements for precision beam displacement.

Accordingly, it is an object of this invention to achieve controlled and selective displacement of an energy beam to provide a controlled output beam that is maintained in parallelism with a reference direction.

SUMMARY OF THE INVENTION

In carrying out the principles of the present invention in accordance with a preferred embodiment thereof, there is provided a first movably mounted beam displacing means that is responsive to an incoming beam to provide a first exiting beam parallel to and displaced from the incoming beam. A second beam displacing means responsive to the first exiting beam provides a second exiting beam that is parallel to and displaced from the first exiting beam. The first beam displacing means is movably mounted and the second beam displacing means is mounted for rotation relative to the first beam displacing means about an axis that is approximately coincident with the first exiting beam. From another point of view, the method of the present invention includes the reflecting of an incoming beam from a first reflecting surface of a group of relatively fixed reflecting surfaces to another reflecting surface of the group so as to direct an emerging beam in a direction parallel to the entering beam. The emerging beam is then caused to impinge upon the first reflecting surface of a second group of relatively fixed reflecting surfaces also positioned to direct an emerging beam reflected from the surfaces thereof in a direction parallel to the entering beam. To achieve a selective displacement of the second exiting beam with respect to the first entering beam, the two groups of reflecting surfaces are selectively and angularly displaced relative to each other about an axis that is at least approximately coincident with the beam that comprises the emerging beam of the first group of surfaces and the incoming beam of the second group of surfaces. The selective angular displacement between the two groups of reflecting surfaces is maintained by a special clamping device which normally locks the two groups together in the desired position. Upon forcing the claming device to open a fixed amount, one group can be rotated with respect to the other group while maintaining sufficient frictional force to prevent the weight of the structure from producing rotation thereby avoiding accidental damage.

BRIEF DESCRIPTION OF THE DRAWING

FIGS. 1a and 1b illustrate certain geometrical relations involved with the present invention, FIG. 2 schematically illustrates an embodiment of the invention with the parts thereof shown in several different positions, FIG. 3 is a pictorial illustration, with parts broken away, of a preferred embodiment of the invention.

GENERAL DESCRIPTION

Figure 12:
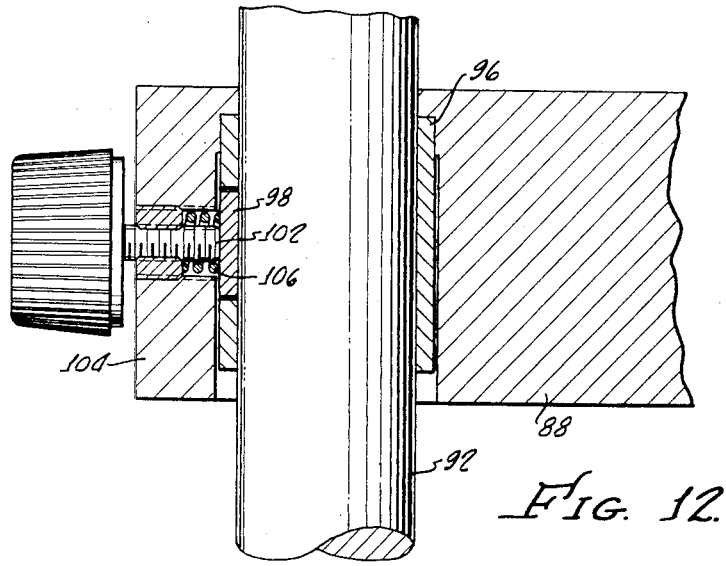

As schematically illustrated in FIG. 1a, a fundamental component of the present invention comprises a parallel beam displacer comprising a pair of mutually parallel reflecting surfaces, 12 and 14, that are fixedly mounted with respect to each other, as by a relatively rigid interconnecting, supporting frame 16. The beam displacer receives an incoming light beam 18, reflects this along an internal path 20 to the second reflecting surface 14, from whence it is reflected along an exiting beam path 22 which is precisely parallel to the incoming beam path 18.

The parallel beam displacer 10 of FIG. 1a has a number of desireable properties which contribute to maintaining the established parallelism of the incoming beam 18 and the exiting beam 22. Should the beam displacer 10 be angularly shifted with respect to the incoming beam 18 such that the displacer now receives an incoming beam along the path 24, for example, the light is then internally reflected along path 26 to emerge along an exiting beam path 28 which is still parallel to the entering path 24.

This same relation is illustrated in FIG. 1b which shows the incoming light beam 18a exactly coincident with the beam 18 of FIG. 1a, but with the beam displacer 10 now angularly shifted as, for example, by pivoting about an axis normal to the plane of the drawing and lying on the surface of the first reflector 12. In this situation, the light beam 18a is reflected internally along the path 20a to the second mirror or reflecting surface 14, from whence it is reflected as the exiting beam 22a. The beam 22a is still exactly parallel to the entering beam 18a, but in this case, because of angular displacement or tilt of the beam displacer relative to the axis of the incoming beam, the exiting beam 22a is now displaced with respect to the exiting beam 22 of the beam displacer when positioned as illustrated in FIG. 1a. In other words, tilting of the beam displacer does not in any way affect the parallelism between the entering and exiting beams, but merely achieves some additional amount of lateral displacement. The immunity of the parallelism of exiting and entering beams to relative tilt of the beam displacer with respect to the entering beam, as illustrated in connection with FIGS. 1a and 1b, is also true for relative tilt of the beam displacer with respect to the entering beam when such tilt occurs about any of a set of three mutually orthogonal axes. The mutually fixed, parallel mirror pair 12, 14 can also be tilted about the axis of the incoming beam 18 or about the axis of the internal beam path 20, all without changing the parallelism between incoming and exiting beams. This characteristic is inherent in the geometry of the arrangement when, as specified herein, the two reflecting surfaces 12 and 14 are precisely parallel to each other.

The reflected exiting beam 22 is of high intensity since little light is lost where the geometry is such as to provide for total internal reflection. As is well known, total internal reflection occurs when the angle between an incident beam and the normal to the reflecting surface is greater than the critical angle of the reflecting interface. In the case of a glass/air interface where, for example, the reflecting surface of the mirror 12 is in contact with air, the critical angle is approximately 41° and 50 minutes whereby the angle of the plane of mirrors 12 and 14 with respect to the incoming and exiting beams 18 and 22 is preferably about 45°. In no event, for materials having a critical angle substantially equal to that of glass, can this angle be greater than 48° and 10 minutes.

Accordingly, the parallel beam displacer 10 of FIG. 1a provides a precise, repeatable and stable exiting beam that is displaced from and always parallel to the entering beam, provided that the two reflecting surfaces lie in precisely parallel planes. The two reflecting surfaces are fixedly connected to each other by a connecting means 16 that exhibits high dimensional stability even when subjected to various environmental conditions such as termperature change, vibration, weight or other conditions.

Consider now an arrangement of two such parallel beam deflectors 30 and 32 as illustrated in FIG. 2. The deflector 30 comprises first and second precisely parallel reflecting surfaces 34, 36 and beam deflector 32 comprises first and second precisely parallel reflecting surfaces 38, 40. As a preferred light source, there is shown an autocollimator 42 mounted and arranged to project a light beam along a path 44 to be received by and reflected from reflecting surface 34 of the first beam deflector 30. The autocollimator 42 may be any one of a number of well known types, such as that shown and described, for example, in U.S. Pat. No. 3,024,365 to R. B. Smith et al.

To briefly describe the autocollimator of the Smith et al., patent, a light source is projected through a beam splitter and an optical system to be impinged upon an externally reflecting mirror of which the angular orientation is to be observed. Light is reflected from the external mirror back through the optical system of the autocollimator to be reflected by the beam splitter and impinge upon a reticle or target that has a fixed or reference position within the autocollimator. The position of the reflected beam within the autocollimator relative to the target reference within the autocollimator provides an indication of the angular orientation of the surface of the external reflecting mirror with respect to the direction of propagation of the impinging light beam.

As illustrated in FIG. 2, the light beam provided by the autocollimator 42 is reflected internally of the beam displacer 30 by the first reflecting surface 34, traverses the interior of the beam displacer to be reflected from the second reflecting surface 36 which provides the first exiting beam on path 46. In the illustrated arrangement, the exiting beam on path 46 itself comprises the incoming beam to the first reflecting surface 38 of the second beam deflector 32. Light reflected from surface 38 internally traverses the second beam displacer to be reflected from the second reflecting surface 40 which provides an exiting beam on path 48 which is directed to an external mirror 50 of which the orientation is to be observed. Light reflected from a mirror 50 traverses the same path in reflection, entering the beam deflector 32 along the path 48, exiting beam displacer 32 and entering beam displacer 30, along path 46, and exiting beam displacer 30 along path 44 to be returned to the autocollimator for completion of the measurement or observation. Several aspects of the system just described are of note. First, as previously described, the beam path 46 is at all times parallel to the beam path 44, and at all times parallel to the beam path 48. Accordingly, paths 44 and 48 are, themselves, parallel to each other. Second, the beam path 48, the second or final exiting beam of the pair of parallel beam displacers 30 and 32, itself is displaced laterally from the entering beam path 44. Thus, in the illustrated position of the several parts, an accurate and precise measurement of the orientation of the external mirror 50 can be made with a given position and setup of the autocollimator 42.

Now consider the need to make the same or similar measurement on a second mirror 52 that is hopefully or desiredly parallel with the mirror 50, but laterally displaced therefrom in a direction parallel to the surface of the two mirrors. To obtain such a measurement, it is only necessary with the schematically illustrated arrangement to rotate, as a unit, both parallel beam displacers 30 and 32 about the axis of the autocollimator beam 44 so as to locate these beam displacers in the positions illustrated at 30a and 32a, respectively. The autocollimator beam 44 is reflected from the now rotated surface 34 internally of beam displacer 30 along the common exiting and incoming path 46a, internally of the rotated beam displacer 32a and along the second exiting path 48a to impinge upon the mirror 52. In this position of the beam displacers, just as in the position thereof illustrated in solid lines, the second exiting beam of 48a is exactly and precisely parallel to the incoming beam 44 and is displaced therefrom by the sum of the distances between reflecting surfaces of each beam displacer as measured along the internal beam paths.

Consider now a third mirror 54 displaced laterally from both mirrors 50 and 52 in a direction parallel to the mirror surfaces and being likewise mounted upon some object whose orientation is to be observed or ascertained. In order to achieve such measurement, the beam displacer 30 will remain in the position thereof illustrated in solid lines in FIG. 2. However, the beam displacer 32 is rotated 180° about the common exiting/incoming axis 42 to the position thereof illustrated at 32b. Now the autocollimator beam traverses path 44 to be reflected internally of beam displacer 30 and emerge as an exiting beam thereof on beam path 46. The exiting beam on path 46 is the incoming beam to the second beam deflector in the position 32b and is reflected internally thereof to provide the second exiting beam 48b that is directed to and reflected from the third mirror 54. Just as with the other mirrors 50 and 52 with the several beam deflectors in the described positions, the beam reflected from mirror 54 now exactly traverses the same path, being reflected internally of beam deflector in position 32b and then internally of beam deflector 30 to be reflected from the surface 34 thereof along path 44 for reception by the autocollimator.

In each of these situations, that is, in each of the three positions of the pair of beam deflectors 30, 32, as illustrated in FIG. 2, a measurement can be made on a different mirror or a mirror in a different position without in any way disturbing or changing the setup or operation of autocollimator 42. The latter is initially established in its reference position and thereafter need not be moved for anyone of a large number of measurements. All that is necessary in the particular operation is to effect rotation of one or both of the beam displacers 30, 32, about the indicated axes of rotation thereof. As previously indicated, the beam displacer 30 is mounted for rotation about an axis that is at least approximately coincident with the incoming beam 44. So, too, the beam displacer 32 is mounted for rotation about an axis that is at least approximately coincident with the common exiting incoming beam axis 46.

The coincidence of the axis of rotation of the respective beam displacer 30 and 32 with the beams 44 and 46, need only be approximate since the parallelism of beams 44 and 46, for reasons previously described, is relatively independent of the relative angular orientation of the beam displacer 30 with respect to the axis of the incoming beam 44. In other words, the beam displacer 30, when mounted for rotation about an axis such as that of the beam 44, may be mounted with considerable tolerance and lack of precision of its angular position without disturbing the parallelism of incoming beam 44 and exiting beam 46. Similarly, no great precision is required in the rotational mounting of beam displacer 32 to the beam displacer 30 since the incoming beam 46 received by beam displacer 32 may exhibit a significant angular misorientation with respect to the beam displacer itself without disturbing the parallelism of incoming beam 46 (incoming to beam displacer 32) and exiting beam 48.

In a preferred rotational mounting of beam displacers 30 and 32, each is mounted for rotation about the respective axes, such as beam 44 and beam 46, for a full 360° of rotation, each is capable of rotating about its axis independently of the other, and both are capable of being locked or clamped in any given position, either independently or together. With this arrangement, the exiting beam 48, 48a, or 48b may be positioned at any given point within a circle centered on the axis 44 and having a radius substantially equal to the distance between the incoming beam 44 and either one of the exiting beams 48, 48a, with both beam displacers in extreme lateral position thereof.

Although a variety of mutually fixed precisely parallel reflective surfaces may be employed with various types of mirror mountings, it is found most convenient, in a preferred embodiment of the present invention, to form the parallel beam displacers 30 and 32, each of a solid rhomboid prism of high grade optical glass. Reflective surfaces 38, 40 and 34, 36 are carefully and precisely ground and polished to provide mutually parallel surfaces. Similarly, those sides of the rhomboidal prisms which pass the entering and exiting beams 44, 46 and 48, are also precisely ground and polished.

Lack of parallelism of the entrance and exiting aperture, those portions of the rhomboidal prism faces forming such aperture, would degrade the parallelism of entering and exiting beams because of the different refractive angles that occur at different surface angles.

In order to obtain and maintain precision optical accuracies of which the described beam displacing apparatus is capable, it is desirable to maximize the homogeneity of the material throughout the prism. A type of glass known as Crown glass is preferred, being a relatively inexpensive material that is capable of meeting these requirements. Where it is desirable or necessary to employ an energy beam in wavelengths beyond the optical band, other materials such as synthetic fused silica or quartz may be employed to provide operation in infrared or ultraviolet wavelengths. Such a material, furthermore, has improved stability and is less affected by temperature. Although the specified parallelism is a high tolerance requirement, the actual nominal 45° angle of the reflective surface with respect to the sides of the prism is not critical since as previously described it is only necessary that the angulation of the reflective surface to the prism side be such as to assure total internal reflection, that is, impingement of the beams upon the reflective surfaces at an angle to the normal to the reflective surfaces greater than the critical angle.

Note that with the arrangement illustrated in FIG. 2, there is not nor is there required any physical connection between the pair of parallel beam displacers and the autocollimator. In fact, it is preferred that the beam displacers be totally independent of the autocollimator. They may be readily removed when the measurement or observation is completed and if the other parts of the measuring apparatus have not been disturbed, the beam displacers may be readily re-emplaced and the measurement may be repeated. The specific relative position of the incoming beam displacing aperture for receiving beam 44 and the exiting beam aperture of beam displacer 32 with respect to the autocollimator on the one hand and the object mirror 50 on the other, are of exceedingly low tolerance since it is only necessary that the incoming beam pass somewhere through the precisely ground entrance aperture and impinge upon the reflective surface 34. Relative lateral displacement of the entire beam displacer assembly with respect to the autocollimator has no affect upon the operation as long as the projected beam is able to be received and reflected through the indicated paths.

DESCRIPTION OF THE PREFERRED EMBODIMENT

A preferred embodiment of a pair of rhomboidal prism parallel beam displacers mounted in accordance with the principles of the present invention is illustrated in FIGS. 3 through 13. A pair of carefully ground and precisely polished rhomboidal prisms, 60, 62, of high grade optical glass are each mounted in an individual one of respective rhomboid mounts 64, 66 (FIG. 3). Most conveniently, each of the mounts is formed of a rigid casting providing a housing for the prism that is rectangular at one end thereof and has the other end beveled in substantial parallelism with the enclosed prism. The particular form or shape of the rhomboid mount is not significant and these can be made in totally rectangular form or in any other form. It will be readily appreciated that at least one of the ends of the mounts is beveled in substantial parallelism with a face of the enclosed prism to avoid possible insertion of the prism in a reversed position. For example, if the prism were to be rotated 180° about its longitudinal axis, the entrance and exiting apertures would be positioned on the wrong side of the mount and the prism so positioned would be inoperative. Each prism is relatively loosely mounted within its housing by means of a substantially "U" shaped spring 68 (FIGS. 4 and 5) which has corners 70 of the bight thereof angulated to conform with bevels 72, 74 notched in corners of the prism to receive and locate the angulated bight portions of the prism retaining spring. The prism is removably mounted within the open topped housing 64 and by means of a housing cover 76. Cover 76 has a peripheral flange 78 which mates with and engages the upper edges of the open top of housing 64 and which are cut away as at 80 to provide clearance for the spring ends and for a pair of spring retaining pins 82, 84. The pins are press fitted in the cover and engage apertures in the end portions of the respective legs of the prism retaining spring. Thus the prism is secured to the cover by the retaining spring and this assembly is readily inserted into the body of the housing 64. Suitable fasteners such as screws, or bolts (not shown) are provided to secure the cover to the housing with the prism emplaced and retained by the spring 68. If deemed necessary or desirable, resilient lining or pads (not shown) are fixed to or mounted within the housing to more snugly and resiliently secure the prism in place within the housing.

It is noted that the mounting of the prism within the housing in no way provides for precision positioning of the prism since such is not necessary for the operation of the invention as described herein.

Figure 13:
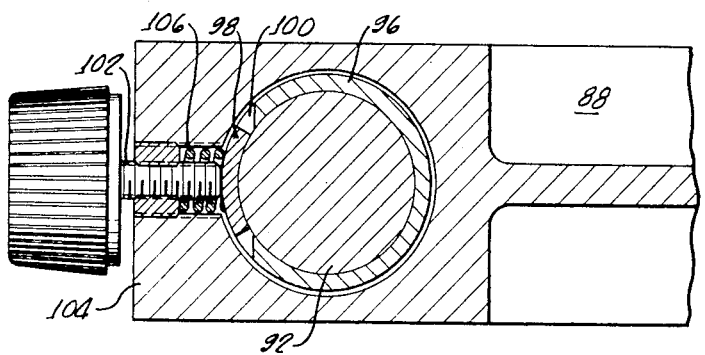
Figure 4:
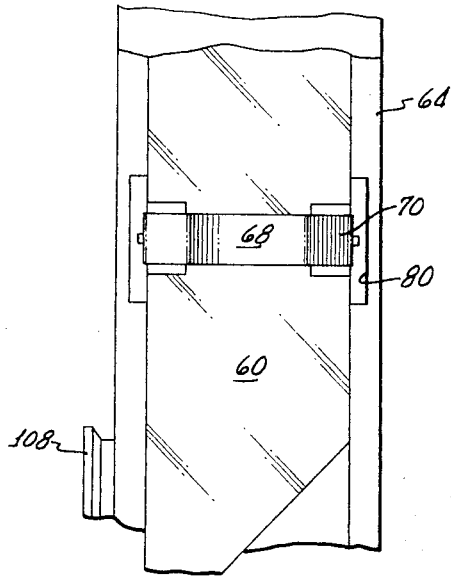
FIGS. 4 and 5 show details of a single beam displacer of the device of FIG. 3, FIGS. 6, 7 and 8 show a rotary joint and clamp employed in the embodiment of FIG. 3, FIGS. 9, 10 and 11 illustrate operation of the eccentric shaft of the clamp of FIGS. 6 through 8, FIGS. 12 and 13 show details of the support stand of FIG. 3.
Figure 6:
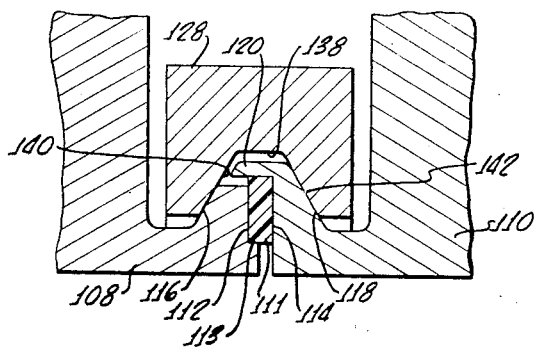
Figure 5:
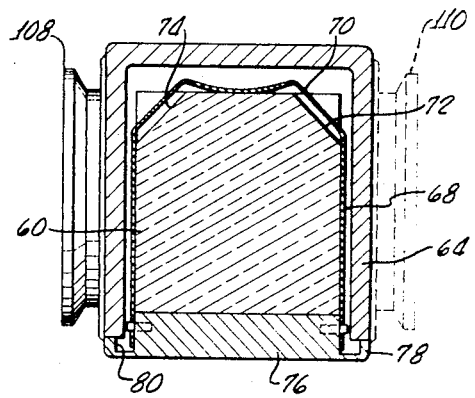

The rhomboid mount 66 is connected to the rhomboid mount 64 by means of a rotary joint and clamp structure 86 (FIG. 3). The rhomboid mount 64 is supported to a rigid arm 88 by means of a second identical rotary joint and clamp structure 90. Arm 88 is slidably and rotatably mounted upon upstanding support column 92 which, in turn, is fixedly secured to and carried by a relatively heavy and stable base in the form of a casting 94. The base, of course, is of sufficient extent and weight to provide a stable support for the relatively movable rhomboid mounts in their position of greatest extension. Arm 88 is apertured to receive a bearing sleeve 96 which circumscribes the support column 92 (FIGS. 12 and 13). A movable sleeve insert 98 substantially conforming to a cutout portion 100 of sleeve 96 is adapted to be pressed against the column 92 to lock the arm 88 thereto by means of a hand-controlled screw 102, threaded in the end 104 of the arm 88 and adapted to compress a spring 106 against the sleeve insert 98 to lock the arm and rhomboid mounts in a given vertical position. The hand screw 102 may be turned to loosen the pressure exerted by and upon spring 106 to thereby release the frictional engagement of the sleeve insert 98 and permit manual vertical positioning of the assembly along the support shaft 92.

As illustrated in FIGS. 5 through 11, the rotational joints that connect the two rhomboid mounts to each other and connect the inner rhomboid mount 64 to the support arm 88, each comprises an inner collar 108 fixed on one of the relatively rotatable parts and an outer collar 110 fixed on the other of such rotatable parts. The two collars have rotational bearing surfaces 112, 114 and clamping or camming surfaces 116 and 118, respectively.

A friction washer 111 of suitable plastic material such as Delron, Teflon or the like is mounted between the bearing surfaces of the collars and retained in position by an upstanding flange 120 on collar 110. The bearing surface 116 of inner collar 108 terminates at the inward portion thereof in a circumferential shoulder 113. The shoulder 113 and upstanding flange 120 of the respective collars are relatively positioned and arranged to closely retain the washer 111 therebetween whereby both radially and axial forces on the rotatable joint are transferred to and through the washer. Axial forces are transferred through the flat surfaces of the washer and radial forces are transferred through the relatively narrow edge portions thereof. The inner rhomboid support 64 has two of the locking and rotatable joint forming collars located on opposite sides thereof and each aligned with the center of an entrance or exit aperture of the prism contained within the mount. The inner rhomboid mount 64 has an outer collar for cooperation with an inner collar (not shown) carried by the support arm 88. On its opposite side, the inner rhomboid 64 is formed with an inner clamp and rotational joint collar for cooperation with an outer collar (not shown) carried by the outer rhomboid mount 66. The latter is formed with but one collar for the rotational joint and clamp since the free end thereof need carry only a suitable aperture for the second exiting beam. A suitable removable protective cover (not shown) is provided. Aside from this lack of a second clamp and joint collar, the two rhomboid mounts are identical.

A clamp comprising two substantially rectangular plates 126 and 128 (FIGS. 7 and 8), each having semi-circular portions 130, 132, has the two parts thereof connected to each other by means of a bolt 133, extending through one of the clamp parts 128, through and into threaded engagement with the second clamp part 126. The semi-circular cutout portions 130, 132 of both parts 126 and 128 of the clamp are circumferentially grooved as indicated at 138 to provide camming surfaces 140, 142 (FIG. 6) adapted to respectively engage the cam shoulders 116 and 118 on the inner and outer collar portions.

The clamping structure is arranged to normally provide a relatively small degree of frictional engagement between the bearing surfaces 112, 114 and the flat surfaces of the washer 111 confined therebetween. Accordingly, two rhomboid mounts, or the rhomboid mount and supporting arm, may be relatively rotated by application of a nominal manual force, but will, nevertheless, experience sufficient friction to maintain the parts in any given position. In locked position, the clamp parts 126 and 128 through the camming action on cam shoulders 116, 118, provide sufficient frictional force between the bearing surfaces and the confined washer as to prevent any relative rotation of the parts whether accidental or intended.

The clamp parts 126 and 128 are formed with rebated overlapping arm portions 127, 129, respectively, which are provided with equal diameter apertures 125, 131 (FIGS. 9, 10) that receive an eccentric locking shaft 136. At least one of the apertures 125, 131, is displaced outwardly relative to the clamp part with respect to a line extending diametrically of the aperture formed by the clamp parts (in the direction of the arrow 123, FIG. 7). Locking shaft 136, having a hand knob 144 and extending through the body of the mount, has a diameter closely equal to the diameters of apertures 125, 131, except for an eccentric decreased diameter portion 146.

Figure 9:
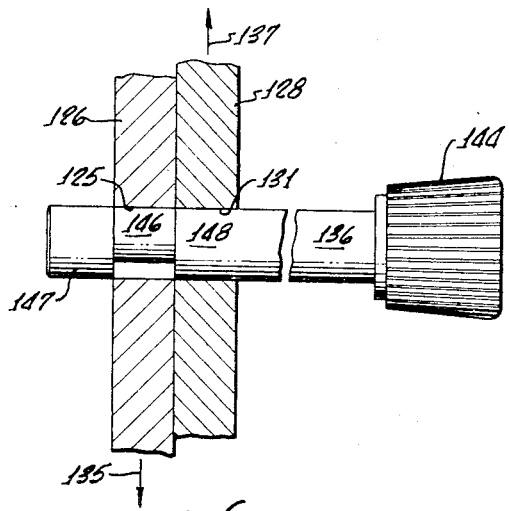

When clamp parts 126 and 128 are emplaced around the periphery of the mating collars 108, 110, and the apertures 125, 131 are in mutual alignment, the two opposite end portions of the clamp parts are mutually spaced from each other. In assembly, the clamp parts are placed around the two collar members with the apertures 125, 131, in mutual alignment. The eccentric shaft 136 is inserted through the body of the rhomboid mount and through the aligned apertures 125, 131, with the shaft rotationally positioned as illustrated in FIG. 9, having its reduced diameter portion 146 or more specifically, the notch formed thereby, facing either upwardly, away from the plane of the paper, or downwardly toward the plane of the paper in the illustration. In other words, in such position, the eccentric shaft 136, is initially positioned at approximately 90° to the position thereof illustrated in FIG. 10. Now the locking or holding screw 133 is inserted through the clamp part 128 and threadedly engaged in the aperture formed in clamp part 126. As holding screw 133 is tightened, the clamp parts tend to be drawn together around the periphery of the co-acting collar members and, accordingly, tend to force the clamp arms 127 and 129 apart, in the direction of the arrows 137, 135 of FIG. 9. To allow such motion, in direction of arrows 137, 135 to occur, the eccentric shaft 136 is slightly rotated simultaneously with the tightening of the holding screw 133, until the parts assume the position illustrated in FIG. 10, wherein clamp part 126 has moved to extreme outward position relative to the extreme outward position of clamp part 128. This is the relatively loose or unlocked position. The notch in the eccentric shaft formed at the reduced diameter portion, 146, thereof, accordingly engages about the clamp part 126 at the aperture 125 thereof, whereby the eccentric shaft is permanently retained in the illustrated axial position thereof. Now, it will be seen that any axial rotation of the eccentric locking shaft 136 from the position illustrated in FIG. 10 will tend to move the clamp parts 126, 128 toward a position wherein the apertures 125, 131 thereof, are in alignment. Such motion will cause the clamp parts 126, 128 to move inwardly radially thereby increasing the frictional locking force exerted on bearing surfaces 112, 114. Thus, with rotation of the locking eccentric shaft of one-quarter turn or less, the clamp may be moved from locked to unlocked position. Further, in both such positions and throughout the relative rotation of the clamp after assembly, the locking eccentric shaft 136 is securely retained in its operating position. The degree of frictional restraint to manually control relative rotation of the parts when in unlocked position, may be varied by further tightening or loosening the holding screw 133. To afford an improved distribution of stresses on the holding screw 133, which is subjected to bending stresses in the illustrated clamping arrangement, the end portion of clamp part 128 is partially enlarged as indicated at 139 to freely receive the shaft portion of the holding screw.

Figure 10:
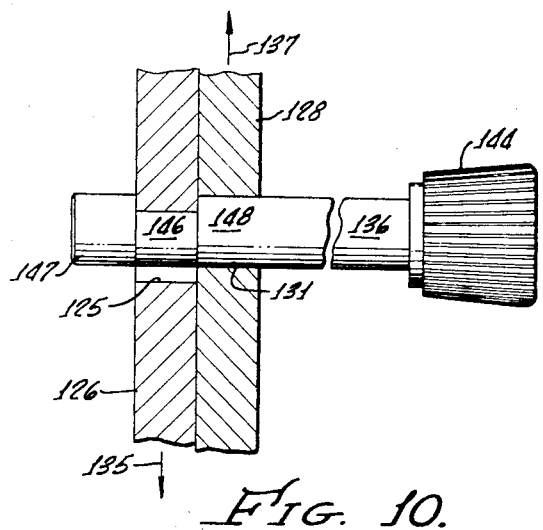
Figure 11:
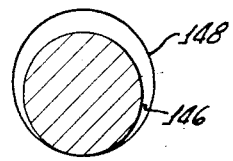

Upon completion of assembly, and once the final amount of tightening of screw 133 has been achieved, the parts in unlocked position will assume the relative position illustrated in FIG. 10. It is not necessary to turn the locking eccentric shaft 136 through a full 90° from the illustrated position in order to achieve full locking. Accordingly, at least some portion of clamp part 126 will be engaged within the notch of the eccentric shaft formed at the eccentric portion 146 thereof at all times and during all positions of the shaft.

The rotatable joint and clamp structure is located on the rhomboid mounts in substantial alignment with the respective polished entrance and exit apertures of the prisms. Structure 90, together with its locking eccentric shaft and knob 150, is identical in structure and operation to the clamp and rotatable joint 86 between the outer and inner rhomboid mounts. Thus, it will be seen that either one or both of the rhomboid mounts may be readily rotated about an axis that is substantially aligned with the entrance aperture of its prism, or more specifically, substantially aligned with the entering or exiting beam thereof, and, nevertheless, may be readily and quickly locked in any position of rotation. The arm 88 is formed with an opening 152 substantially in alignment with the entrance aperture to the inner prism 60 whereby a light beam from suitable light source or autocollimator may be projected through the opening 152 of the arm into the entrance aperture of prism 160 for reflection therefrom to the entrance aperture of the prism mounted in the outer rhomboid mount and thence, to be reflected outwardly along the operating line of sight, displaced as desired.

With the arrangement illustrated in FIG. 3 the practical magnitude of displacement available is limited by the maximum length of rhomboidal prisms that are capable of being manufactured with adequate tolerances and within feasible economic constraints. Systems of the type described have been made with rhomboid prisms having a length between parallel reflective surfaces thereof of 4 to 5 inches to thereby provide a total magnitude of radius displacement of 8 to 10 inches. Although rhomboidal prisms of somewhat greater lengths are possible, for those situations where considerably greater magnitudes of displacement are required, such as displacements on the order of several feet, for example, it is preferred to employ suitable mirrors precisely mounted at respective ends of rigid, hollow structural supports. Such an arrangement has the additional advantage of avoiding the limitation imposed by use of a glass prism, which will not pass infrared and far ultraviolet. Accordingly, parallel mirrors mounted on ends of a hollow tube will provide a parallel beam displacing apparatus capable of operation in a frequency band of from 200 to 2,500 nanometers. Evacuation of the space between the parallel mirrors would provide still further increase in bandwidth.

Other disadvantages deriving from the use of a prism involve the required perpendicularity of the face of the prism which may provide an undesired reflection. Accordingly, with a prism, it is desirable to use a suitable anti-reflection coating to minimize such reflection. Because the operation of such anti-reflection coating peaks at specific wavelengths, the optimum operation of prismatic beam displacers is still further limited in wavelength.

Figure 14:
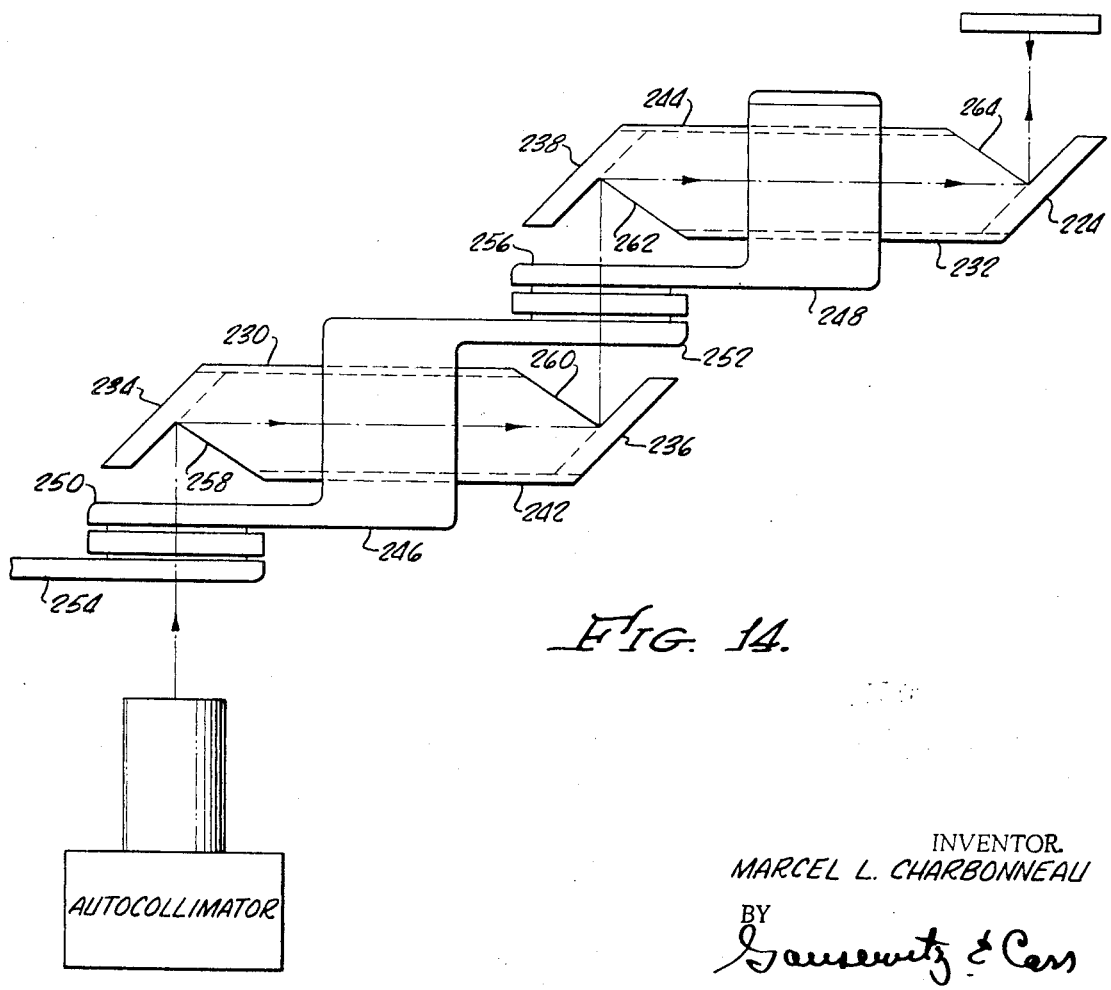
FIG. 14 illustrates a modification of the invention.
Figure 7:
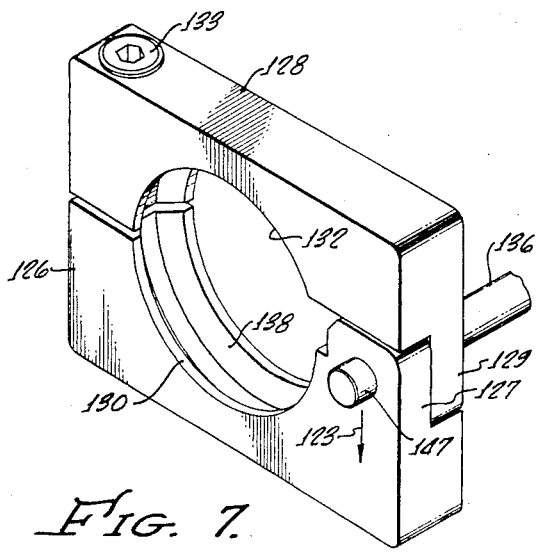
Figure 8:
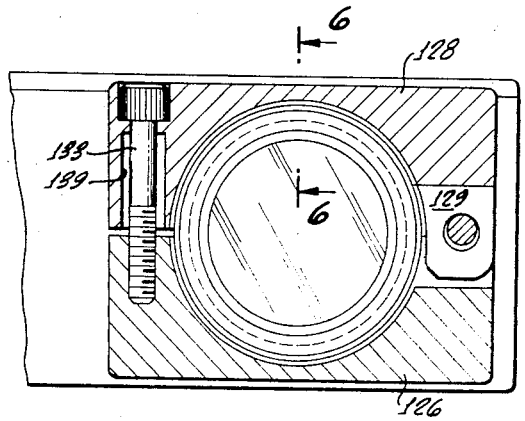

Illustrated in FIG. 14 is an arrangement that avoids the described limitations of prisms. A pair of parallel beam displacers each comprises a pair of parallel mirrors mounted on a rigid cylinder such as a relatively long hollow quartz tubes. In this arrangement, a first rotatably mounted parallel beam displacer comprises first and second precisely parallel and mutually fixed mirrors 234, 236, of a first beam displacer 230. A second rotatably mounted parallel beam displacer 232 comprises first and second mirrors 238, 240, fixedly mounted to each other in precise parallelism. The mirror pair 234, 236, are adhesively bonded to the beveled ends of a hollow quartz tube 242, and a similar hollow tube 244 fixedly mounts the parallel mirrors 238, 240. The tubes 242 and 244 are carried in centrally mounted supports 246, 248, respectively. Support 246 has first and second arms, 250, 252, that extend for rotational engagement and connection to a support arm 254 for the inner beam displacer and to a rotational pivot arm 256 of the center support 248 of the second tube 244 of parallel beam displacer 232.

In the arrangement illustrated in FIG. 14, no careful grinding or polishing of entrance apertures is required since it is only necessary to cut away the entering and exiting portions of the mounting tubes as indicated at 258, 260 for tube 242 and at 262, 264 for tube 244. With this arrangement, the support arm 254 may be mounted in the same manner as the corresponding support arm of the previously described embodiment for elevational adjustment and azimuth rotation. The two parallel beam displacers are each mounted for rotation about axes at least approximately coincident with the entering light beam of each so as to provide selective positioning of the parallel exiting beam at any point within the area of a circle having a radius equal to the sum of the distances between mirror pairs. In this arrangement, the length of each parallel beam displacer is limited only by the dimensional, temperature, and structural stability of the mounting tubes. Displacement in any pattern within a radius of four feet or more is possible.

Although, embodiments of the invention employing manual operation, adjustment, and control have been described, it will be readily appreciated that small motors, either locally or remotely controlled, may be employed to provide power operation for any of the adjustable motions of the described apparatus. Thus, it is contemplated to provide a motor at each of the rotatable joints. Such motors could be combined with a motorized vertical adjustment of the pair of parallel beam displacers. In such an arrangement, the motors could be operated collectively in a closed-loop fashion to provide or achieve a predetermined positioning of the exiting beam. Thus, the position of the exiting beam may be compared with a desired position and suitable control signals sent to one or a combination of the motors to minimize the difference between the actual and desired exit beam positions.

It is also contemplated to provide suitable rotary scales at each of the pivot joints with vernier adjustments as may be required or desired in order to provide a visible scale to assist in moving the exiting beam to a desired position. Such scales may, if desired, be graduated to directly read in units of linear displacement, each individually indicating the linear displacement of one of the exiting beams with respect to the initial incoming beam.

If deemed necessary or desirable, a vernier adjustment of the final exiting beam may be achieved by employing a parallel face beam displacer, such as the flat glass plate illustrated in FIG. 2 of the aforementioned patent to R. B. Smith et al. Such parallel face displacer may be positioned either at the entrance or exiting aperture of the parallel beam displacers.

Although but two parallel beam deflectors are illustrated in the described embodiments, it will be readily appreciated that a third and more parallel beam displacers may be added to and mounted on the outermost of one of those illustrated, to provide an increased radius of beam displacement. Thus, for example, with reference to the arrangement shown in FIG. 3, a third parallel beam displacer exactly identical to that described as beam displacer 62, 66, would be mounted to and carried by beam displacer 62, 66 for rotation relative thereto about the exiting beam axis. Such additional third parallel beam displacer would be positioned and mounted with respect to beam displacer 62, 66 exactly as the latter is positioned and mounted to and with respect to beam displacer 60, 64. Of course, in such a situation of more than two beam displacers, the rigidity of all of the elements becomes of greater significance. This is so even though the system will tolerate misalignment between the rotational axes and beam directions. With larger distances, and greater masses cantilevered from a center support, the maintenance of any given position and the susceptibility of the apparatus to ambient vibrations creates severe problems. Nevertheless, within such constraints and to the extent that such problems of support and vibration may be either accepted or overcome by the use of temporary auxiliary outboard supports of outer ones of successive parallel beam displacers, the available radius of total displacement may be greatly expanded.

There has been described a unique method and apparatus for achieving selected and controllable displacement of a line of sight to and within any point within a given circular area while maintaining the precise parallelism between the original and transferred or displaced line of sight. It will be readily appreciated that such an arrangement has an exceedingly wide range of applications and only some of these are enumerated in order to indicate the nature and extent of such usages that have not been previously described herein. Accuracy of a flat or parabolic mirror may be checked throughout the entire surface area thereof by employing the beam displacer to project a beam at various points of the mirror and observing the position and orientation of the beam reflected from such different points. Binoculars may be tested for collimation of optical axes. Verticality of images or parallelism of cross hairs in sighting instruments may be checked. One or more alignment telescopes or autocollimators may be aligned to a common reference point or mirror without the use of transfer mirrors. Where an autocollimator or other source of reference line of sight cannot be employed because of physical constraints of space or access, the beam displacer may enable alignment operations not heretofore possible. Homogeneity of an optical material such as checking of the refractive index of glass may be studied and observed as by mounting a glass to be observed and immersing it in oil adjacent a reflector. As the beam is selectively displaced by means of the described parallel beam displacer, it is transmitted and reflected through the glass under test at different points thereof, whereby the orientation of reflected beam is indicative of the relative refraction thereof by different points of the glass under test. Although many different applications of the apparatus and method described have been suggested herein, it will be understood that these are only exemplary, and many other applications employing selectively controlled parallel beam displacement are considered to be within the scope of the present invention.

The foregoing detailed description is to be clearly understood as given by way of illustration and example only, the spirit and scope of this invention being limited solely by the appended claims.

I claim:
1. Apparatus for positioning an energy beam comprising:
a plurality of beam displacing means, each being responsive to an incoming beam for providing an exiting beam parallel to and displaced from said incoming beam and each beam displacing means having an entrance aperture for said incoming beam and an exit aperture for said exiting beam and further having a first circular flange centered about said entrance aperture for said incoming beam and a second circular flange centered about said exit aperture for said exiting beam;
a plurality of clamping devices for connecting together said plurality of beam displacing means, each clamping device having a pair of clamping jaws for accepting said first circular flange from one of said plurality of beam displacing means and said second circular flange from another of said plurality of beam displacing means, said jaws being rigidly fastened together for aligning and holding said first flange juxtaposed said second flange with a friction force normally sufficient to rigidly attach and lock said one beam displacing means to another whereby said plurality of beam displacing means is formed into a rigid structure; and
means for forcing apart said clamping jaws by a fixed amount for reducing said friction force, said fixed amount being selected to provide a minimal friction force to maintain rigid support of said structure of beam displacing means while allowing said one beam displacing means to be circularly rotated with respect to the other beam displacing means whereby an exiting beam from said structure of beam displacing means is positioned with respect to an incoming beam thereto.

2. The apparatus described in claim 1 wherein said clamping device comprises:
a pair of rectangular plates, each having a semi-circular aperture therein, said plates being juxtaposed to form a circular aperture into which said first and second circular flanges are inserted; and
means for fastening said plates about said flanges, said means pulling said plates together at one point to hold said flanges with frictional force sufficient to lock said beam displacing means.

3. The apparatus described in claim 2 wherein said means for forcing apart is a cam means positioned diagonally opposite said means for fastening, said cam means being rotatively fastened to one of said plates, the cam surface thereof being adjacent to the other said plates whereby said plates are forced apart a fixed amount as said cam is rotated, thereby reducing said frictional force to unlock said beam displacing means while providing sufficient frictional force to render said structure self-supporting.

4. The apparatus described in claim 3 wherein each of said beam displacing means comprises a pair of parallel reflecting surfaces whereby said incoming beam is always parallel to said exiting beam.

5. The apparatus described in claim 4 further comprising a rigid cylinder structure and wherein said parallel reflecting surfaces are mounted in said rigid cylinder structure, said cylinder structure having apertures therein for the ingress and egress of said incoming and exiting beams, respectively.

6. The apparatus described in claim 4 wherein each of said beam displacing means is a rhomboid prism and said pair of parallel reflecting surfaces are the end surfaces of said prism.

7. Beam displacing apparatus comprising:
first and second rhomboidal prisms having parallel reflective surfaces and side faces, said side faces having at least end portions thereof opposite said respective parallel surfaces polished and parallel to each other to provide optical entrance and exit apertures;
means for pivotally mounting said second prism to said first prism for rotation about an axis substantially aligned with a normal to both the polished end portion of one face of said first prism and the polished end portion of one of the faces of said second prism, said means having a first housing enclosing said first prism and a second housing enclosing said second prism, each housing having first and second apertures cooperating with said polished end portions of the prism faces to provide entrance and exit apertures for the respective prisms, said first and second housings having first and second collars projecting therefrom, respectively, for mutual rotational engagement, said first collar surrounding the aperture of said first housing and having a bearing surface and an outwardly diverging circumferential cam shoulder, said second collar surrounding and aligned with the aperture of said second housing and having a bearing surface mating with the bearing surface of said first collar, and having an outwardly diverging circumferential cam shoulder, one of said collars having an outwardly projecting circumferential flange encompassing the other of said collars;
a clamp having an internal circumferential groove, diverging radially inwardly, said groove having cam surfaces cooperatively engaging the cam shoulders of said first and second collars, said clamp having first and second diametrically opposed portions connected to each other at one end thereof, and having slightly laterally displaced apertures in said first and second diametrically opposed portions and an operating shaft extending through said apertures and having a first portion of diameter equal to the diameter of the apertures and snugly engaged in the aperture of one of said clamp portions, said operating shaft having an eccentric reduced diameter portion positioned in said aperture of the other clamp portion, whereby rotation of said operating shaft causes said eccentric portion to transversely displace said other clamp portion relative to said one clamp portion by a fixed amount to effectively lock and unlock said two bearing surfaces into frictional engagement by respectively causing said internal clamp groove to move radially inwardly to cammingly engage said collar cam shoulders and to move radially outwardly to release said camming engagement.

* * * * *